(12) United States Patent
Deng et al.

(10) Patent No.: US 10,946,873 B2
(45) Date of Patent: Mar. 16, 2021

(54) DISTRACTED DRIVING ELIMINATION SYSTEM

(71) Applicant: GM Global Technology Operations LLC, Detroit, MI (US)

(72) Inventors: Zhiqiang Deng, Shanghai (CN); Yusheng Zou, Northville, MI (US); Jiang L. Du, Beaverton, OR (US); Marco Gatti, Grosse Ile, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 36 days.

(21) Appl. No.: 16/447,086

(22) Filed: Jun. 20, 2019

(65) Prior Publication Data
US 2020/0346658 A1 Nov. 5, 2020

(30) Foreign Application Priority Data
Apr. 30, 2019 (CN) .......................... 201910358708.7

(51) Int. Cl.
| | |
|---|---|
| *B60W 50/14* | (2020.01) |
| *B60W 40/09* | (2012.01) |
| *G06K 9/00* | (2006.01) |
| *G05D 1/00* | (2006.01) |
| *B60W 50/08* | (2020.01) |

(52) U.S. Cl.
CPC ............ *B60W 50/14* (2013.01); *B60W 40/09* (2013.01); *B60W 50/082* (2013.01); *G05D 1/0061* (2013.01); *G06K 9/00845* (2013.01); *B60W 2050/143* (2013.01); *B60W 2050/146* (2013.01); *G05D 2201/0213* (2013.01)

(58) Field of Classification Search
CPC .... B60W 50/14; B60W 50/082; B60W 40/09; B60W 2050/143; B60W 2050/146; G06K 9/00845; G06K 9/00832; G05D 1/0061; G05D 2201/0213; G08B 21/06; B60K 28/02; A61B 5/18
See application file for complete search history.

(56) References Cited

U.S. PATENT DOCUMENTS

| | | | |
|---|---|---|---|
| 10,115,164 B1 * | 10/2018 | Binion ................. | B60W 50/14 |
| 10,245,977 B2 * | 4/2019 | Torii ..................... | B60N 2/767 |
| 2009/0284474 A1 * | 11/2009 | Komaki ............. | B60R 11/0264 |
| | | | 345/173 |

(Continued)

*Primary Examiner* — Ryan W Sherwin

(57) ABSTRACT

A distracted driving elimination system includes an image capture device within a passenger compartment of an automobile capturing images of a first hand and a second hand of a vehicle operator and a steering wheel. An analysis unit has a geometry and visual characteristics of multiple predetermined items saved in a memory. The analysis unit receives the images and compares the images to the predetermined items saved in the memory to identify if any one of the first hand or the second hand of the vehicle operator is not in direct contact with the steering and is in direct contact with one of the predetermined items thereby initiating a distracted driving event. A distracted driving signal is generated when the distracted driving event is initiated. An indication system generates an indication when the distracted driving signal is forwarded, the indication alerting the vehicle operator of the distracted driving event.

16 Claims, 6 Drawing Sheets

(56) References Cited

U.S. PATENT DOCUMENTS

| | | | |
|---|---|---|---|
| 2013/0314314 A1* | 11/2013 | Hamada | G09G 5/14 345/156 |
| 2014/0116744 A1* | 5/2014 | Smeja | H02G 3/32 174/50 |
| 2015/0186714 A1* | 7/2015 | Ren | H04N 7/183 348/77 |
| 2016/0103499 A1* | 4/2016 | Yamamoto | G06K 9/00335 345/156 |
| 2016/0210504 A1* | 7/2016 | Kim | G06F 3/017 |
| 2016/0357186 A1* | 12/2016 | Dias | B60W 50/082 |
| 2017/0061222 A1* | 3/2017 | Hoye | G06K 9/00791 |
| 2017/0344838 A1* | 11/2017 | Zhou | G06T 7/77 |
| 2018/0154903 A1* | 6/2018 | Song | B60W 50/12 |
| 2018/0173974 A1* | 6/2018 | Chang | G06T 5/20 |
| 2018/0253094 A1* | 9/2018 | Chang | A61B 5/14542 |
| 2018/0326992 A1* | 11/2018 | Aoi | B60W 50/14 |
| 2020/0001910 A1* | 1/2020 | Chow | B62D 6/007 |
| 2020/0012872 A1* | 1/2020 | Autran | G06K 9/6284 |

* cited by examiner

DISTRACTED DRIVING ELIMINATION SYSTEM

INTRODUCTION

The present disclosure relates to automobile distracted driving elimination systems.

Distracted driving is a major cause of crashes and fatalities on the road and impacts thousands of people each year. Distracted driving behaviors have been studied. It has been found that most distractive driving behaviors include some form of hand activity. Examples include cell phone usage, eating, drinking, shaving, application of makeup or grooming, entering GPS system data, adjustment of audio or climate control systems, holding a pet, smoking behaviors such as reaching for and lighting a cigarette or activating a cigarette lighter, and reaching for a child. Current automobile vehicle distracted driving prevention systems provide in-vehicle cameras or similar sensing devices which are operated in conjunction with facial recognition software and are generally directed to and monitor a vehicle operator's eyes. Such facial recognition systems can indicate if a driver is tired, falling asleep or that the driver's eyes are not directed to the road in front of the vehicle, however facial recognition systems do not recognize motion of other items and do not distinguish items which may be involved in distracted driving occurrences such as those identified above.

Thus, while current automobile vehicle distracted driving alert systems achieve their intended purpose, there is a need for a new and improved system and method for identifying distracted driving behavior.

SUMMARY

According to several aspects, a distracted driving elimination system for an automobile includes an image capture device within a passenger compartment of the automobile capturing images of at least one hand of a vehicle operator and a steering wheel. An analysis unit having multiple predetermined items saved in a memory receives the images from the image capture device and compares the images to the predetermined items to identify if the at least one hand of the vehicle operator contacts one of the predetermined items thereby initiating a distracted driving event.

In another aspect of the present disclosure, a distracted driving signal is generated when the distracted driving event is initiated. An indication system has the distracted driving signal forwarded to the indication system.

In another aspect of the present disclosure, the indication system includes at least one of: an audible device heard within the passenger compartment; and a visual warning device visible to the vehicle operator.

In another aspect of the present disclosure, a distracted driving signal is generated when the distracted driving event is initiated; and an infotainment system has at least one feature locked out upon receipt of the distracted driving signal.

In another aspect of the present disclosure, the at least one hand defines a first hand and a second hand, and the image capture device defines a camera having a field-of-view capturing images of the first hand and the second hand.

In another aspect of the present disclosure, the field-of-view of the image capture device further includes a passenger of the automobile and captures images of any of the predetermined items contacted by the passenger.

In another aspect of the present disclosure, the distracted driving event is not initiated when any of the predetermined items are held only by the passenger.

In another aspect of the present disclosure, the image capture device and the analysis unit are continuously active during a driving event defined as when the automobile is in motion or operating and not parked.

In another aspect of the present disclosure, continuous monitoring is conducted to determine if the at least one hand is in direct contact with the steering wheel, and the distracted driving event is initiated if the at least one hand breaks contact with the steering wheel and contacts any of the predetermined items.

In another aspect of the present disclosure, the predetermined items include a device charging wire, a hand-held device including a smart phone, a portable computer, a tablet, a cylindrical object including a cup or a can, and a figurate object.

According to several aspects, a distracted driving elimination system for an automobile includes an image capture device within a passenger compartment of the automobile capturing images of a first hand and a second hand of a vehicle operator and a steering wheel. An analysis unit has a geometry and visual characteristics of multiple predetermined items saved in a memory. The analysis unit receives the images from the image capture device and compares the images to the predetermined items saved in the memory to identify if any one of the first hand or the second hand of the vehicle operator is not in direct contact with the steering and is in direct contact with one of the predetermined items thereby initiating a distracted driving event. A distracted driving signal is generated when the distracted driving event is initiated. An indication system generates an indication when the distracted driving signal is forwarded to the indication system, the indication alerting the vehicle operator of the distracted driving event.

In another aspect of the present disclosure, the distracted driving event is also initiated when the analysis unit identifies any one of the first hand or the second hand of the vehicle operator is in direct contact with the steering and is also in direct contact with one of the predetermined items.

In another aspect of the present disclosure, the image capture device defines a camera having a field-of-view capturing the images; and the field-of-view of the image capture device also captures a passenger of the automobile and includes any of the predetermined items being held by the passenger.

In another aspect of the present disclosure, the distracted driving event is not initiated when any of the predetermined items are held only by the passenger.

In another aspect of the present disclosure, a facial recognition artificial intelligence program functions in conjunction with the analysis unit.

In another aspect of the present disclosure, the image capture device defines a camera capturing images at and proximate to the steering wheel, and images of facial features of the vehicle operator including eyes of the vehicle operator, the images of the facial features analyzed using the facial recognition artificial intelligence program.

In another aspect of the present disclosure, the indication system includes an audible device within the passenger compartment and a visual warning device visible to the vehicle operator.

According to several aspects, a method for eliminating distracted driving events for an automobile, comprises: capturing images of a first hand and a second hand of a vehicle operator and a steering wheel using an image capture device; forwarding the images to an analysis unit having a geometry and visual characteristics of multiple predetermined items saved in a memory; the analysis unit comparing the images to the predetermined items saved in the memory and identifying if any one of the first hand or the second hand of the vehicle operator is not in direct contact with the steering and is in direct contact with one of the predetermined items thereby initiating a distracted driving event; generating a distracted driving signal when the distracted driving event is initiated; and providing an indication from an indication system upon receipt of the distracted driving signal by the indication system, the indication alerting the vehicle operator of the distracted driving event.

In another aspect of the present disclosure, the method further includes: prior to the capturing step activating the image capture device if the automobile is running and is not parked; after the capturing step determining if both the first hand and the second hand are visible; and identifying if both the first hand and the second hand are off the steering wheel, defined as not in direct contact with the steering wheel.

In another aspect of the present disclosure, the method further includes connecting the analysis unit to an autonomous driving system and applying an output from the analysis unit to transition between a driver engaged event and an autonomous driving event Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
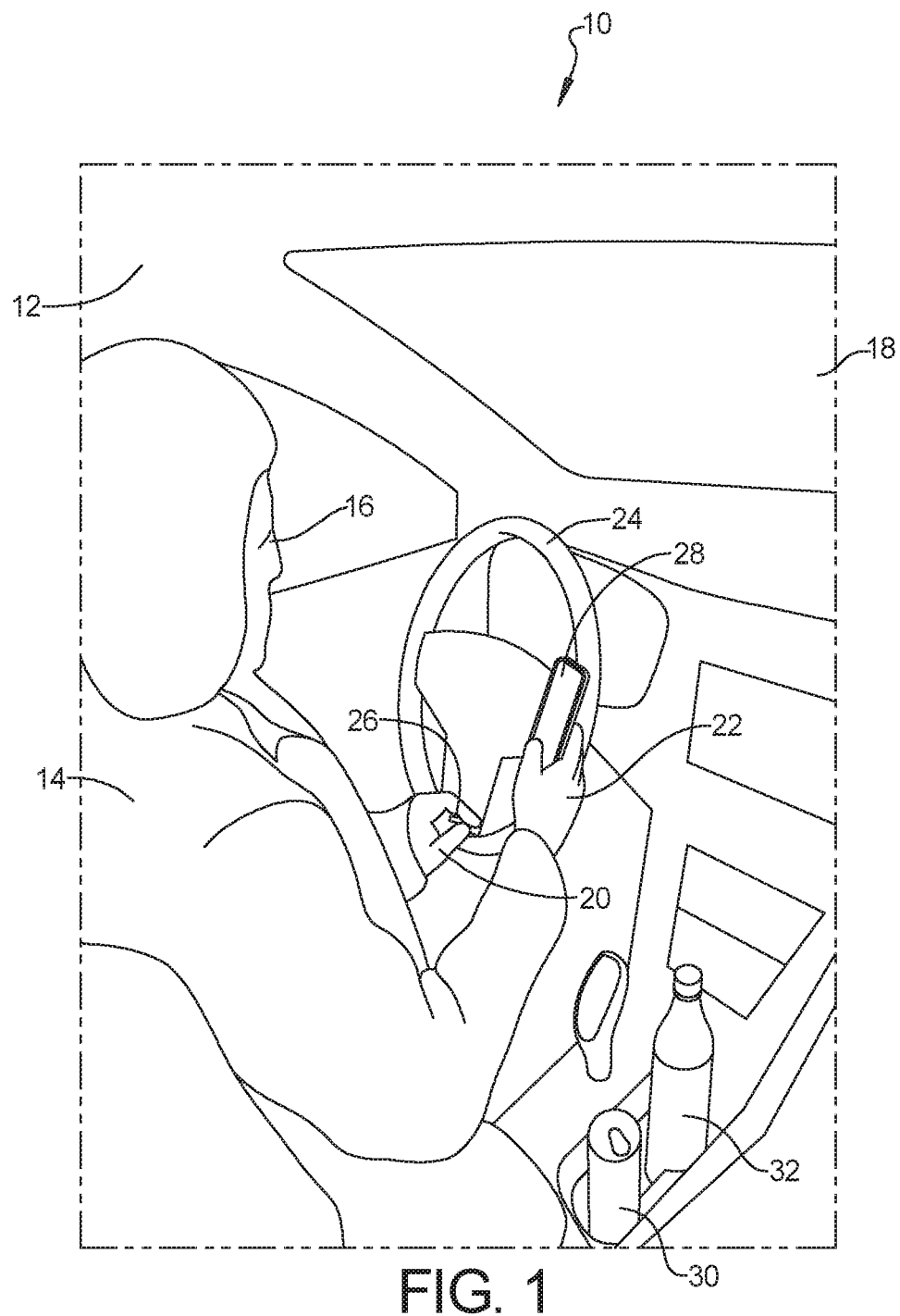
FIG. 1 is a rear right perspective view looking forward of a distracted driving elimination system for an automobile according to an exemplary aspect.

Referring to FIG. 1, a distracted driving elimination system 10 is provided for a vehicle such as an automobile 12 which recognizes and warns of distracted driving events by a vehicle operator 14 or driver which are not limited to whether eyes 16 of the vehicle operator are focused on a roadway 18 ahead or surrounding the automobile 12. The distracted driving elimination system 10 recognizes each of a first hand 20 and a second hand 22 of the vehicle operator 14, and further recognizes multiple predetermined items in or contacted by one of the first hand 20 or the second hand 22 during a driving event, herein defined as when the automobile 12 is in motion or operating but not parked.

The distracted driving elimination system 10 initially recognizes a steering wheel 24 and identifies if at least one of the first hand 20 or the second hand 22 are in contact with the steering wheel 24. The distracted driving elimination system 10 also recognizes the multiple predetermined items. For example, the predetermined items recognized and distinguished by the distracted driving elimination system 10 include but are not limited to an electronic wire 26 such as a charging wire used to recharge a device battery, a hand-held device 28 such as a smart phone, a portable computer or a tablet, a cylindrical object 30 such as a cup or a can, and a figurate object 32 such as a soda bottle, and including other items such as but not limited to a food item such as a hamburger, a brush or lipstick holder, shifters, radio controls, and portable hand-held devices including electric shavers. The distracted driving elimination system 10 continuously monitors if at least one of the first hand 20 or the second hand 22 or both are in direct contact with the steering wheel 24 and indicates a distracted driving event is occurring if any other predetermined item is contacted by one of the first hand 20 or the second hand 22 during the driving event. In the example provided in FIG. 1, the vehicle operator 14 is holding the electronic wire 26 in the first hand 20, while also holding the hand-held device 28 in the second hand 22. Either, none of or both of the first hand 20 and the second hand 22 can also be in contact with the steering wheel 24. A distracted driving event is therefore indicated by the conditions sensed in FIG. 1.

Referring to FIG. 2 and again to FIG. 1, in another example of a distracted driving event, the first hand 20 of the vehicle operator 14 is in contact with the steering wheel 24, however a predetermined item such as the figurate object 32 is being held by the second hand 22. Whenever one of the first hand 20 or the second hand 22 of the vehicle operator 14 is in contact with a predetermined item an analysis unit 34 of the distracted driving elimination system 10 generates a distracted driving signal which is forwarded to an indication system 36. The indication system 36 can include but is not limited to an audible device 38 that can be heard within the passenger compartment and a visual warning device 40 such as an indicator light visible to the vehicle operator 14. Remedial actions can also be taken based on occurrence of a distracted driving event and generation of the distracted driving signal. Remedial actions can include reducing an amount of information presented to the vehicle operator 14, for example by disabling a user interface such as to an infotainment system.

It is further noted that although the first hand 20 of the vehicle operator 14 is in contact with the steering wheel 24, the first hand 20 is also holding one of multiple predetermined items 42 whose geometry and recognizable visual characteristics are saved in a memory 43 of the analysis unit 34 or are learned by an artificial intelligence program 45 included in the analysis unit 34. In an exemplary aspect the predetermined item 42 defines a bottle cap of the figurate object 32 shown as a bottle. It is also noted the analysis unit 34 can be connected to an autonomous or semi-autonomous driving system for autonomous or semi-autonomous operation of the automobile 12, hereinafter referred to collectively as an autonomous driving system 47. The distracted driving elimination system 10 is configured to monitor the vehicle operator 14 and determines if the vehicle operator 14 is operating the automobile 12 in a safe manner. In response to verifying the vehicle operator 14 is operating in a safe manner, user interface options are available at an infotainment system described below for an automobile passenger. For example, a navigation input for a desired destination is usually disabled in an automobile while the automobile is in drive or is moving to prevent distracted driving. If the distracted driving elimination system 10 determines that the vehicle operator 14 is operating the automobile 12 safely the passenger is permitted to manage the navigation input for a new destination if the automobile 12 is in drive and/or is moving.

The predetermined items 42 can distract the vehicle operator 14 by reducing or completely preventing hand contact with the steering wheel 24. In addition, because in this example the vehicle operator 14 is drinking from the figurate object 32 defining a bottle, even if the automobile 12 is stopped such as at a stop sign or a stop light while the vehicle remains in operation and is not parked, a pedestrian 44 may not be immediately recognized by the vehicle operator 14. The presence of the pedestrian 44 in addition to the presence of any one of multiple predetermined items 42 is therefore coordinated with the distracted driving elimination system 10 to generate a distracted driving event, thereby generating the distracted driving signal which is forwarded to the indication system 36.

Figure 2:
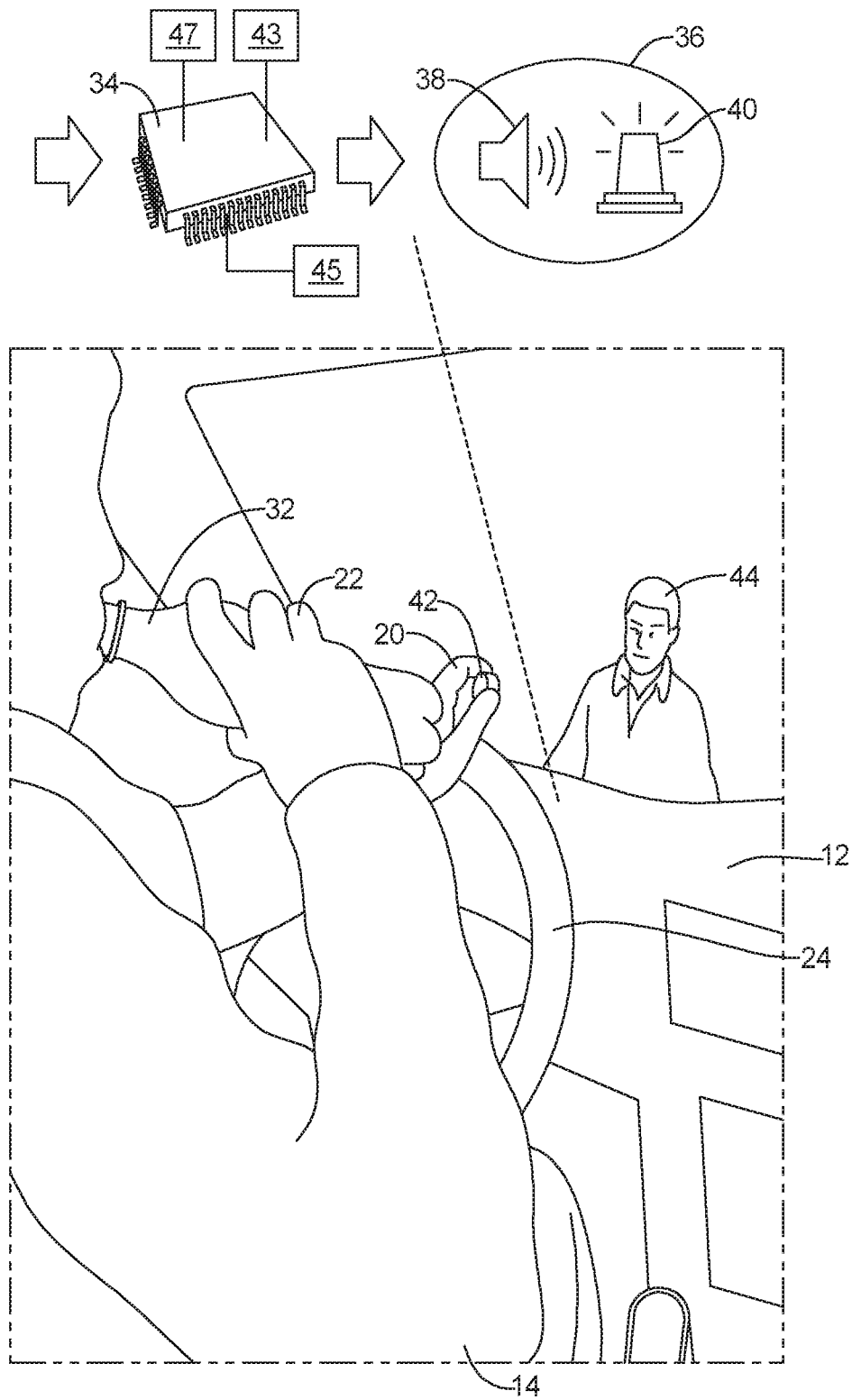
FIG. 2 is a rear right perspective view looking forward similar to FIG. 1.

Referring to FIG. 3 and again to FIG. 2, the distracted driving elimination system 10 provides at least one and according to several aspects multiple image capture devices 46 positioned within a passenger compartment 48 of the automobile 12 used to capture images of the first hand 20, the second hand 22 and the steering wheel 24. According to several aspects, the image capture devices 46 include a first camera 50 which can be mounted proximate to a vehicle pillar such as an A-pillar 52 or to other structure within the passenger compartment 48 including to a vehicle interior roof. The first camera 50 provides a field-of-view 54 which captures at least the vehicle operator 14 (not shown in FIG. 3 for clarity) including at least the first hand 20 and the second hand 22, and the steering wheel 24. The field-of-view 54 can also include items which the vehicle operator 14 can manually access, such as a GPS device 56, a radio 58, a shifter 60 and an infotainment system 62 having for example a manual option select device. As previously noted, remedial actions taken in response to the distracted driving signal can include reducing an amount of information presented to the vehicle operator 14, for example by disabling the option select device 62 of an infotainment system. At least a portion of an operator side vehicle seat 64 and a passenger side vehicle seat 65 are also captured in the field-of-view 54.

According to several aspects, the image capture devices can include a second camera 66 which can be used alone or in combination with the first camera 50. The second camera 66 can be mounted proximate to a vehicle pillar such as a second A-pillar 68 or to other structure such as the roof within the vehicle passenger compartment 48. The second camera 66 provides a field-of-view 70 which captures at least the vehicle operator 14 (not shown in FIG. 3 for clarity) and the steering wheel 24, as well as the items listed above for the first camera 50. The first camera 50 and the second camera 66 alone or in combination cover 100% of the visible behaviors and activities of the first hand 20 and the second hand 22 within the passenger compartment 48.

Figure 3:
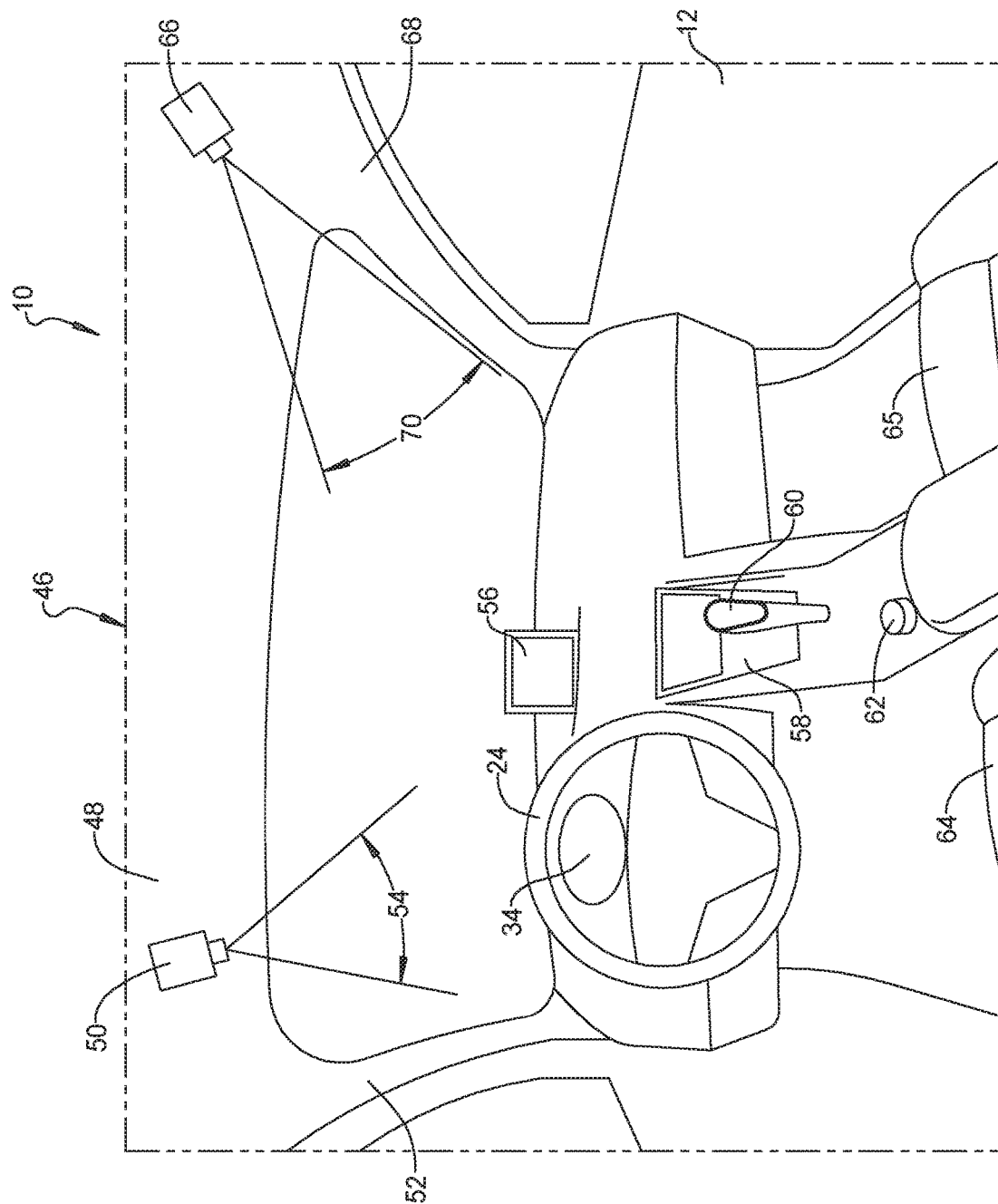
FIG. 3 is a rear perspective view looking forward of the automobile of FIG. 1.
Figure 4:
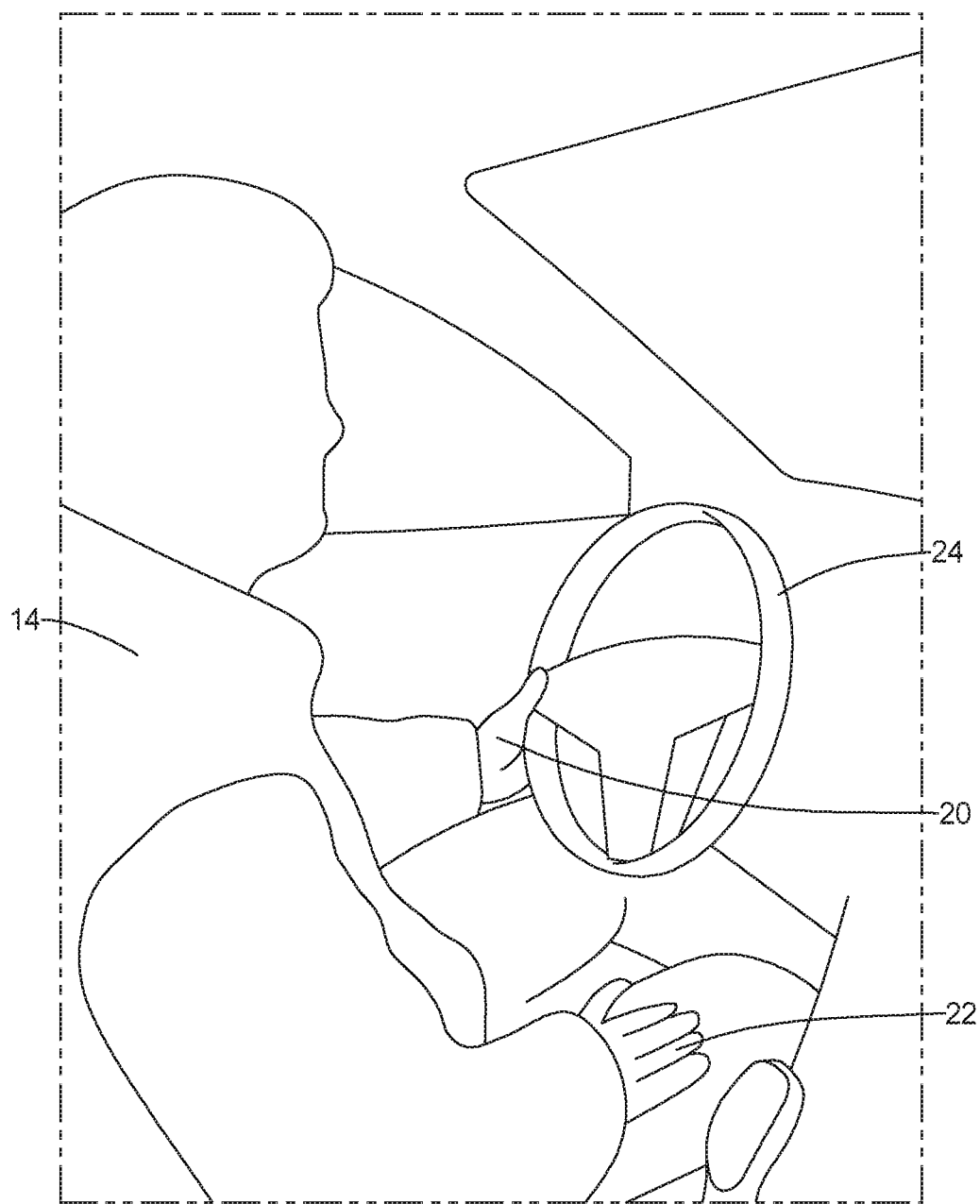
FIG. 4 is a rear right perspective view looking forward similar to FIG. 1.

Referring to FIG. 4 and again to FIGS. 1 through 3, the distracted driving elimination system 10 can distinguish a non-distracted driving event shown, from a distracted driving event such as shown in reference to FIGS. 1 and 2. An example of a non-distracted driving event can include the vehicle operator 14 having both the first hand 20 and the second hand 22 in contact with the steering wheel 24. A further example of a non-distracted driving event as shown in FIG. 4 can include the vehicle operator having one hand such as the first hand 20 in contact with the steering wheel 24, while the vehicle operator's other hand such as the second hand 22 is not in contact with the steering wheel 24, but is also not holding or contacting one of the predetermined items such as those described above. The automobile 12 if also equipped with the autonomous driving system 47 may, upon recognition of a non-distracted driving event, use the recognition output from the distracted driving elimination system 10 to transition from an autonomous or semi-autonomous driving event to a driver engaged event or to transition from a driver engaged event to an autonomous or semi-autonomous driving event.

Figure 5:
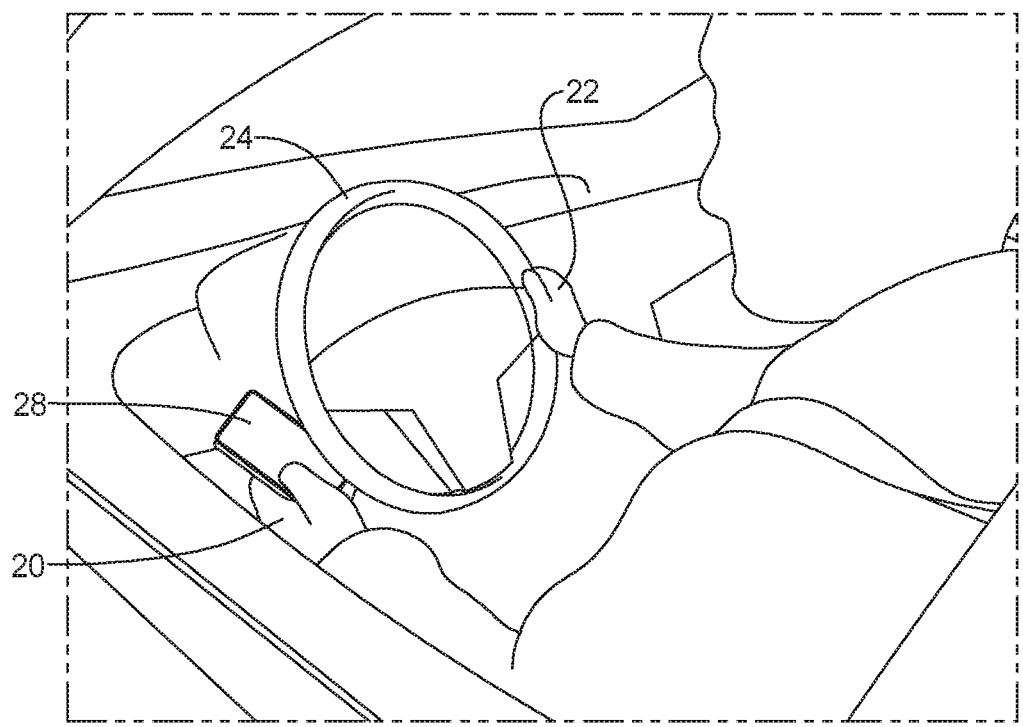
FIG. 5 is a rear left perspective view looking forward of the system of FIG. 1.

Referring to FIG. 5 and again to FIGS. 1 through 4, the distracted driving elimination system 10 can distinguish a distracted driving event shown from the non-distracted driving event shown in reference to FIG. 4. The distracted driving event is indicated by the second hand 22 of the vehicle operator 14 being in contact with the steering wheel 24 while the first hand 20 is contacting a predetermined item such as the hand-held device 28. The vehicle operator 14 may be generating a text message, answering or making a phone call, reading an email message or conducting a data search.

Figure 6:
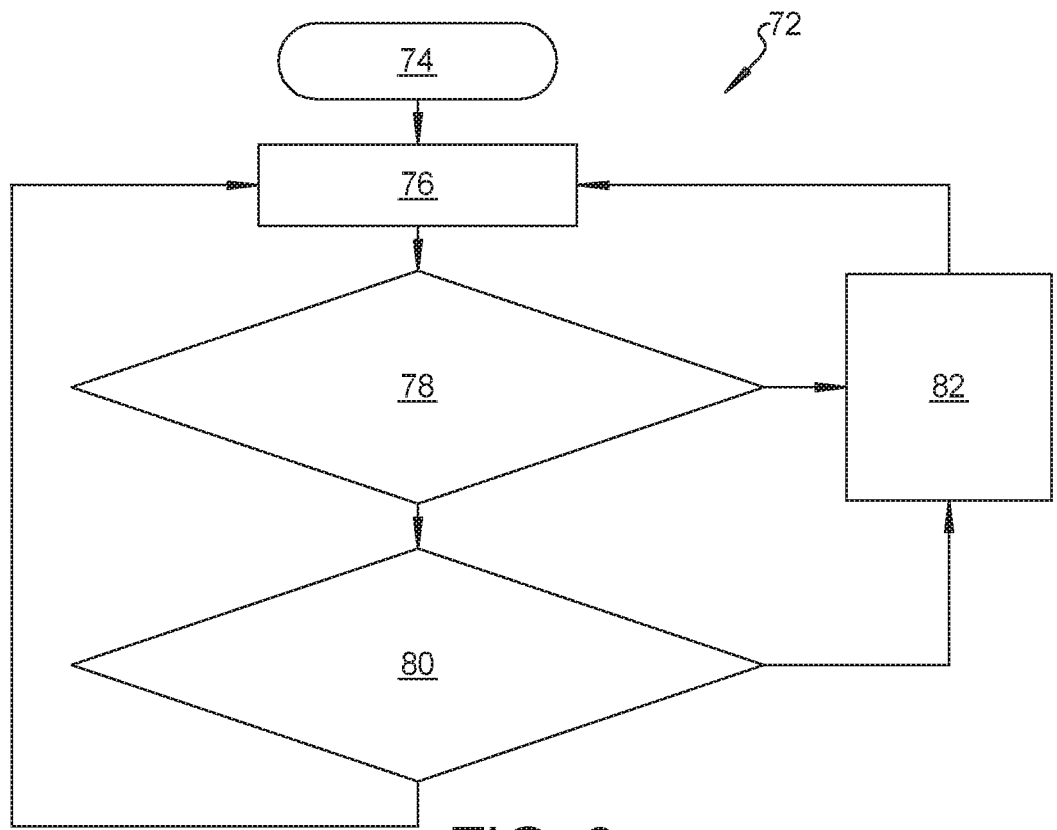
FIG. 6 is a flow diagram of the operational steps for the distracted driving elimination system of the present disclosure.

Referring to FIG. 6 and again to FIGS. 1 through 5, a flow diagram 72 presents steps taken by the distracted driving elimination system 10. In a first step 74 the system is activated when the automobile 12 is running and is not parked, which includes during stops made at red lights, stop signs, in traffic, and the like. In a second step 76 the image capture devices such as the first camera 50 and the second camera 66 capture images at and proximate to the steering wheel 24. In a third step 78 a determination is made if both the first hand 20 and the second hand 22 are visible. If a response to the third step 78 is YES, in a fourth step 80 a determination is made if one or both the first hand 20 and the second hand 22 is contacting or holding a predetermined item. In addition, it is determined if both the first hand 20 and the second hand 22 are off the steering wheel 24, defined as not in direct contact with the steering wheel 24. If the response to both determinations made in step 80 is NO, the distracted driving elimination system 10 returns to and repeats the second step 76.

If the response to the third step 78 is NO, meaning that both of the vehicle operator's hands are not visible, a warning signal 82 is generated following a predetermined time threshold. According to several aspects the predetermined time threshold can be 1.5 seconds. According to several aspects, the warning signal 82 can take the form of an audio warning, a visual warning, a haptic warning, or a combination of the three warnings. According to several aspects, the warning signal 82 is sent to an infotainment system so that one or more user interface inputs may be disabled. According to further aspects, the warning signal 82 is sent to a semi-autonomous system which can for example be used to slow the automobile 12 speed down. In addition, the warning signal 82 is generated following the predetermined time threshold if the response to the fourth step 80 is YES, meaning one or more of the first hand 20 and the second hand 22 are sensed to be contacting or holding one of the predetermined items and/or both the first hand 20 and the second hand 22 are off the steering wheel 24. Following generation of the warning signal 82 the distracted driving elimination system 10 returns to and repeats the second step 76.

It is noted that actions taken by the second hand 22 to contact predetermined items such as the shifter 60 and a parking brake lever are designated as non-distracted driving events. The warning signal 82 is not generated in response to these actions as they are anticipated for normal operation of the automobile 12.

Figure 7:
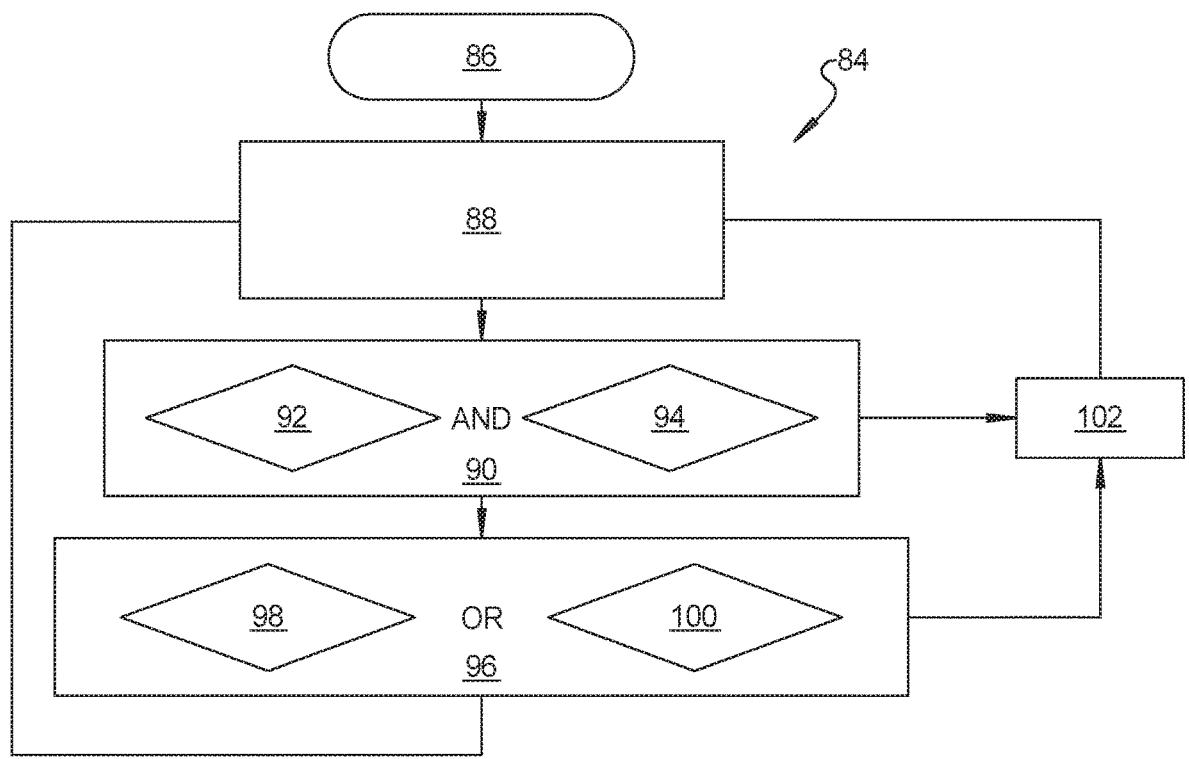
FIG. 7 is a flow diagram modified from FIG. 6 to further include facial recognition capability.

Referring to FIG. 7 and again to FIGS. 1 through 6, a flow diagram 84 combines features of the distracted driving elimination system 10 with facial recognition and other technologies, to improve the accuracy of decision making for signal generation. In a first step 86 the system is activated when the automobile 12 is running and is not parked, which includes stops made at red lights, stop signs, in traffic, and the like. In a second step 88 the image capture devices such as the first camera 50 and the second camera 66 capture images at and proximate to the steering wheel 24, images of facial features including the eyes are captured, and additional data is collected such as from touch sensors and the like. In a third step 90 two stage determinations are made. In a first stage determination 92 a determination is made if both the first hand 20 and the second hand 22 are visible. In a second stage determination 94 a determination is made if the vehicle operator's eyes are focused on the upcoming road. If a response to both the first stage determination 92 and the second stage determination 94 is YES, the program moves to a fourth step 96.

In the fourth step 96 two stage determinations are made. In a third stage determination 98 a determination is made if one or both the first hand 20 and the second hand 22 is contacting or holding a predetermined item. In addition, it is determined if both the first hand 20 and the second hand 22 are off the steering wheel 24. In a fourth stage determination 100 a determination is made if the vehicle operator's eyes are not focused on the upcoming road. If the response to either the third stage determination 98 OR the fourth stage determination 100 is NO, the program returns to and repeats the second step 88.

If during the third step 90 a response to both the first stage determination 92 and the second stage determination 94 is NO, a warning signal 102 similar to the warning signal 82 is generated following a predetermined time threshold. According to several aspects, the warning signal 102 can take the form of an audio warning, a visual warning, a haptic warning, or a combination of the three warnings. If during the fourth step 96 a response to the third stage determination 98 OR a response to the fourth stage determination 100 is YES, the warning signal 102 is generated. Following generation of the warning signal 102 the distracted driving elimination system 10 returns to and repeats the second step 88.

Figure 8:
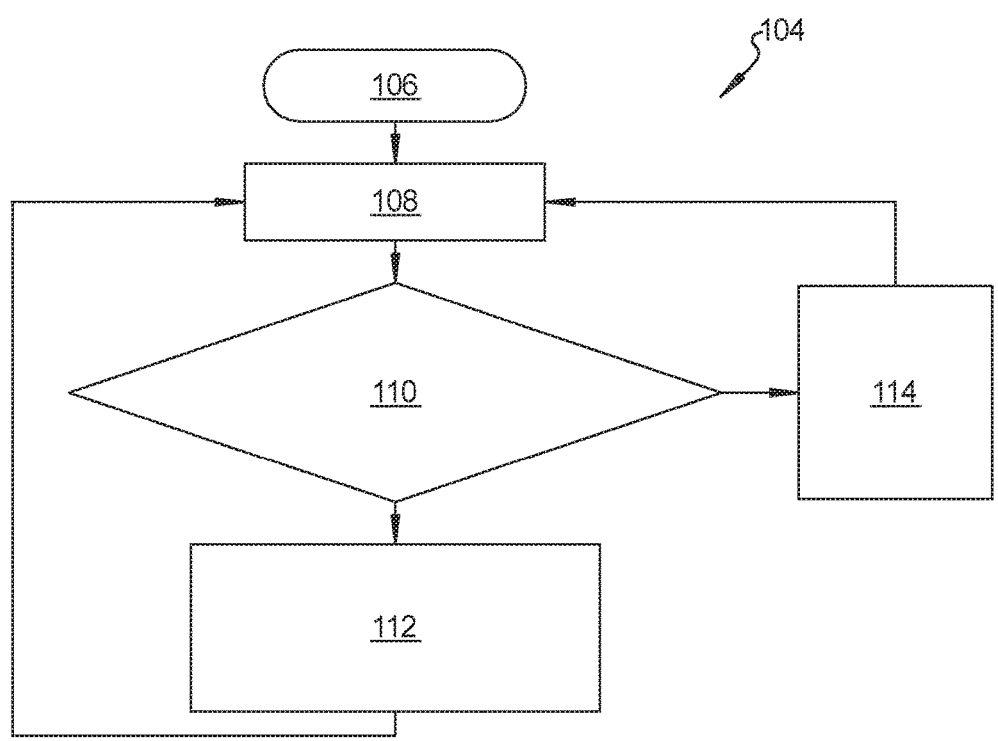
FIG. 8 is a flow diagram modified from FIG. 6 to further include both vehicle operator and vehicle passenger hand image collection.

Referring to FIG. 8 and again to FIGS. 1 through 7, a flow diagram 104 combines features of the distracted driving elimination system 10 for collecting images of the vehicle operator 14 and a vehicle passenger (not shown) seated in the passenger side vehicle seat 65 shown and described in reference to FIG. 3. In a first step 106 the system is activated when the automobile 12 is running and is not parked, which includes stops made at red lights, stop signs, in traffic, and the like. In a second step 108 the image capture devices such as the first camera 50 and the second camera 66 capture images of the hands of the vehicle operator 14 and of the passenger. In a third step 110 a determination is made if either or both of the vehicle operator's hands (20, 22) are operating features of a vehicle screen, a system button or a system such as an infotainment system OR if either or both of the vehicle passenger's hands are operating features of the vehicle screen, the system button or system such as the infotainment system.

If the response to the determination made in the third step 110 is that either or both of the vehicle operator's hands (20, 22) are operating the one or more features, in a fourth step 112 a warning is activated following a predetermined time threshold similar to the warning signal 82. The warning signal generated in the fourth step 112 also prevents or disables predetermined functions, reactions, or responses into or from the vehicle screen, the system button or the system such as the infotainment system. Following generation of the warning in the fourth step 112 the distracted driving elimination system 10 returns to and repeats the second step 108.

If the response to the determination made in the third step 110 is that either or both of the vehicle passenger's hands are operating the one or more features, in a fifth step 114 no warning is activated and the vehicle passenger is allowed to operate and is enabled control of the predetermined functions, reactions, and responses into or from the vehicle screen, the system button or the system such as the infotainment system. Following the fifth step 114 the distracted driving elimination system 10 returns to and repeats the second step 108.

A distracted driving elimination system 10 of the present disclosure offers several advantages. These include a system that utilizes image recognition technology to detect, warn, and eliminate distracted driving behaviors by analyzing a driver's hands. The system provides a set of devices that captures images of a vehicle operator's hands near and/or on a steering wheel and processes the images to identify the states of the hands, such as being on the steering wheel, free from the steering wheel, contacting or holding objects and the like, and provides a warning when it is determined that a distracted driving event is happening. The system can also function together with facial recognition and other haptic systems to identify and signal other distracted driving behaviors such as manual and visual distractions with higher accuracy.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A distracted driving elimination system for an automobile, comprising:
    an image capture device within a passenger compartment of the automobile capturing images of at least one hand of a vehicle operator and a steering wheel; and
    an analysis unit having multiple predetermined items saved in a memory, the analysis unit receiving the images from the image capture device and comparing the images to the predetermined items to identify if the at least one hand of the vehicle operator contacts one of the predetermined items thereby initiating a distracted driving event;
    wherein the at least one hand defines a first hand and a second hand, and the image capture device defines a camera having a field-of-view capturing images of the first hand and the second hand; and
    wherein the field-of-view of the image capture device further includes a passenger of the automobile and captures images of any of the predetermined items being held by the passenger.

2. The distracted driving elimination system of claim 1, further including:
a distracted driving signal generated by the analysis unit when the distracted driving event is initiated; and
an indication system wherein the distracted driving signal is forwarded to the indication system.

3. The distracted driving elimination system of claim 2, wherein the indication system includes at least one of:
an audible device heard within the passenger compartment; and
a visual warning device visible to the vehicle operator.

4. The distracted driving elimination system of claim 1, further including:
a distracted driving signal generated by the analysis unit when the distracted driving event is initiated; and
an infotainment system having at least one feature locked out upon receipt of the distracted driving signal.

5. The distracted driving elimination system of claim 1, wherein the distracted driving event is not initiated when any of the predetermined items are held only by the passenger.

6. The distracted driving elimination system of claim 1, wherein the image capture device and the analysis unit are continuously active during a driving event defined as when the automobile is in motion or operating and not parked.

7. The distracted driving elimination system of claim 1, wherein continuous monitoring is conducted to determine if the at least one hand is in direct contact with the steering wheel, and wherein the distracted driving event is initiated if the at least one hand breaks contact with the steering wheel and contacts any of the predetermined items.

8. The distracted driving elimination system of claim 1, wherein the predetermined items include a device charging wire, a hand-held device including a smart phone, a portable computer, a tablet, a cylindrical object including a cup or a can, and a figurate object.

9. A distracted driving elimination system for an automobile, comprising:
an image capture device defining a camera within a passenger compartment of the automobile capturing images of a first hand and a second hand of a vehicle operator and a steering wheel;
an analysis unit having a geometry and visual characteristics of multiple predetermined items saved in a memory, the analysis unit receiving the images from the image capture device and comparing the images to the predetermined items saved in the memory to identify if any one of the first hand or the second hand of the vehicle operator is not in direct contact with the steering wheel and is in direct contact with one of the predetermined items thereby initiating a distracted driving event;
a distracted driving signal generated by the analysis unit when the distracted driving event is initiated; and
an indication system generating an indication when the distracted driving signal is forwarded to the indication system, the indication alerting the vehicle operator of the distracted driving event; and
wherein the distracted driving event is also initiated when the analysis unit identifies any one of the first hand or the second hand of the vehicle operator is in direct contact with the steering wheel and is also in direct contact with one of the predetermined items.

10. The distracted driving elimination system of claim 9, wherein:
the camera having a field-of-view capturing the images; and
the field-of-view of the image capture device also captures an image of a passenger of the automobile and includes any of the predetermined items being held by the passenger.

11. The distracted driving elimination system of claim 10, wherein the distracted driving event is not initiated when any of the predetermined items are held only by the passenger.

12. The distracted driving elimination system of claim 9, further including a facial recognition artificial intelligence program functioning in conjunction with the analysis unit.

13. The distracted driving elimination system of claim 12, wherein the image capture device defines a camera capturing images at and proximate to the steering wheel, and images of facial features of the vehicle operator including eyes of the vehicle operator, the images of facial features analyzed using the facial recognition artificial intelligence program.

14. The distracted driving elimination system of claim 9, wherein the indication system includes an audible device within the passenger compartment and a visual warning device visible to the vehicle operator.

15. A method for eliminating distracted driving events for an automobile, comprising:
capturing images of a first hand and a second hand of a vehicle operator and a steering wheel using an image capture device defining a camera;
forwarding the images to an analysis unit having a geometry and visual characteristics of multiple predetermined items saved in a memory;
the analysis unit comparing the images to the predetermined items saved in the memory and identifying if any one of the first hand or the second hand of the vehicle operator is not in direct contact with the steering wheel and is in direct contact with one of the predetermined items thereby initiating a distracted driving event;
generating a distracted driving signal when the distracted driving event is initiated; and
providing an indication from an indication system upon receipt of the distracted driving signal by the indication system, the indication alerting the vehicle operator of the distracted driving event;
prior to the capturing step activating the image capture device if the automobile is running and is not parked;
after the capturing step determining if both the first hand and the second hand are visible; and
identifying if both the first hand and the second hand are off the steering wheel, defined as not in direct contact with the steering wheel.

16. The method of claim 15, further including connecting the analysis unit to an autonomous driving system and applying an output from the analysis unit to transition between a driver engaged event and an autonomous driving event.

* * * * *